(12) United States Patent
Khanna et al.

(10) Patent No.: US 7,941,810 B2
(45) Date of Patent: May 10, 2011

(54) EXTENSIBLE AND FLEXIBLE FIRMWARE ARCHITECTURE FOR RELIABILITY, AVAILABILITY, SERVICEABILITY FEATURES

(75) Inventors: Rahul Khanna, Portland, OR (US); Jian Tang, Shanghai (CN); Yufu Li, Shanghai (CN)

(73) Assignee: Intel Corporation, Santa Clara, CA (US)

( * ) Notice: Subject to any disclaimer, the term of this patent is extended or adjusted under 35 U.S.C. 154(b) by 1138 days.

(21) Appl. No.: 11/648,419

(22) Filed: Dec. 28, 2006

(65) Prior Publication Data

US 2008/0163256 A1    Jul. 3, 2008

(51) Int. Cl.
*G06F 9/54* (2006.01)
*G06F 9/44* (2006.01)

(52) U.S. Cl. ........ 719/318; 717/168
(58) Field of Classification Search ........ 719/318
See application file for complete search history.

(56) References Cited

U.S. PATENT DOCUMENTS 6,336,139 B1 * 1/2002 Feridun et al. ............ 709/224
6,658,470 B1 * 12/2003 deBardelaben ............ 709/224
2004/0216136 A1 * 10/2004 Laschkewitsch et al. ..... 719/318
2006/0112307 A1 * 5/2006 Marisetty et al. ............ 714/11
2007/0033315 A1 * 2/2007 Nguyen et al. ............ 710/302

OTHER PUBLICATIONS

Sahoo et al—2002—Providing persistent and consistent resources through event log analysis and predictions for large-scale computing systems—IBM TJ Watson Research Center—8 pages.

* cited by examiner

*Primary Examiner* — H. S. Sough
*Assistant Examiner* — Abdou K Seye
(74) *Attorney, Agent, or Firm* — Blakely, Sokoloff, Taylor & Zafman LLP

(57) ABSTRACT

Improved reliability, availability, and serviceability (RAS) is provided by an extensible and flexible firmware architecture. The architecture provides management for events, where an event is a response to an imminent failure of or capacity change requirement applicable to a component of the system. In response to an event, control of a system is transferred from an operating system to the firmware manager. The manager identifies an action that is specified by the event. Based on the action, the firmware manager selects a firmware handler from a plurality of firmware handlers. The firmware manager dispatches the selected firmware handler to perform the specified action. The firmware manager and the dispatched firmware handler exchange system-independent information regarding the event. The firmware manager also manages time-slices for the performance of the specified action by the dispatched firmware handler.

27 Claims, 5 Drawing Sheets

EXTENSIBLE AND FLEXIBLE FIRMWARE ARCHITECTURE FOR RELIABILITY, AVAILABILITY, SERVICEABILITY FEATURES

FIELD

The invention generally relates to improved reliability, availability and serviceability of computing systems with a modular approach. More specifically, it relates to an extensible and flexible firmware architecture for improved reliability, availability, and serviceability in such systems.

BACKGROUND

Mainframes and server systems used in mission-critical environments are often designed and built to keep running for long periods of time without faults that cause erroneous output or system down-time. The need for more robust systems is increasing as system architectures become more complex. Even desktop systems are being designed and built with complex system interconnects and with multiple processor cores.

System traits that keep systems running for lengthy periods of time with minimal down-time include reliability, availability, and serviceability (collectively, "RAS"). Many features, called RAS features, are built into systems to increase reliability, availability, and serviceability. Among these are parity checks for memory components and buses, redundant system resources and components, parts that are more resistant to failure, temperature sensors to detect and respond to increased processor temperatures in real time, the ability to perform hot swapping of components, and many other features.

One set of RAS features increases a system's ability to detect and respond to an imminent failure of a system component without a system crash or a need to shut-down a system. Early detection of an imminent failure of a system component may allow a system sufficient time for a response that avoids system down-time.

Once an imminent failure of a system component is detected, an important RAS feature is the system's ability to respond without system down-time or the generation of faulty output. This ability is provided, in some systems, by system firmware. At times, this system firmware may temporarily assume control of a system to respond to a threat.

BRIEF DESCRIPTION OF THE DRAWINGS

Certain embodiments of the invention may be understood by reference to the following detailed description read with reference to the accompanying drawings.

BRIEF SUMMARY

Figure 1:
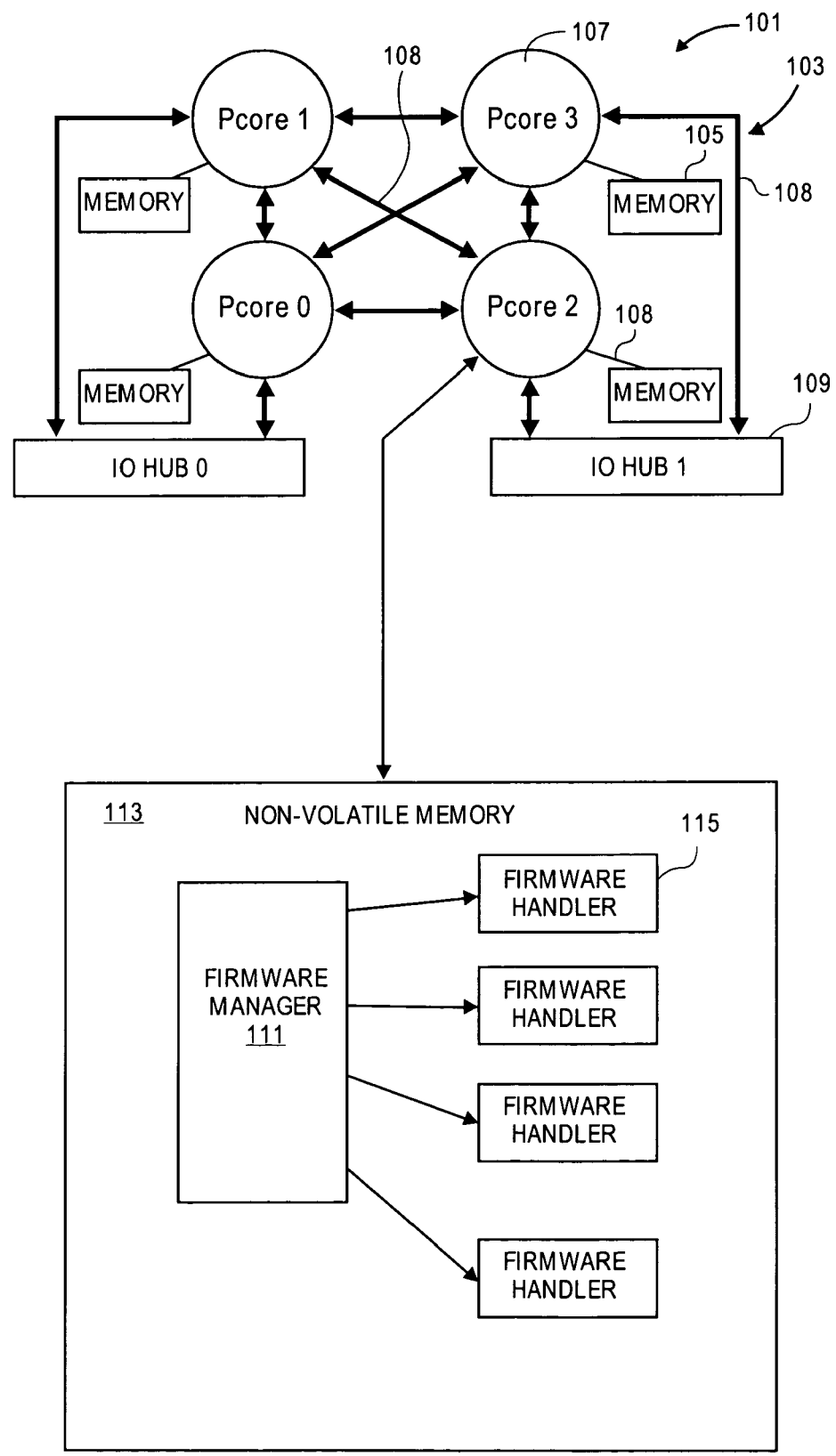
FIG. 1 is a block diagram of point-to-point, multi-socket system with a firmware manager according to certain embodiments.

According to one embodiment of the invention, a method comprises: transferring control of a system from an operating system to a firmware manager responsive to an event, wherein the event is a response to an imminent failure of or capacity change requirement applicable to a component of the system, the event specifying an action to be performed; selecting, with the manager, a firmware handler from a plurality of firmware handlers, based on the action to be performed; dispatching, with the manager, the selected handler to perform the action; and exchanging system-independent information regarding the event between the manager and the dispatched handler.

According to one embodiment of the invention, system comprises: a plurality of processor cores; a plurality of memories; a plurality of links defining routes between at least some of the cores and memories; a firmware dispatcher module stored in a memory of the plurality to instruct a processor core of the plurality: to transfer control of the system from an operating system to the dispatcher responsive to a reliability, availability and serviceability (RAS) event, wherein the event is a response to an imminent failure of or capacity change requirement applicable to a system component and the event specifies an action to be performed; and to select a firmware handler from a plurality of firmware handlers and to dispatch the selected firmware handler to perform the action, the processor to select the firmware handler from the plurality based upon the action to be performed; and a firmware agent module stored in the memory to instruct the processor to obtain system-specific information regarding the event and to provide system-independent information regarding the event to the dispatched firmware handler.

DETAILED DESCRIPTION

System availability for server systems used in mission critical environments is rated on an availability class—a measure of the percentage of system available time per year. System reliability, availability, and serviceability (RAS) features are key factors in achieving the high system availability required by mission critical environments. In such systems:

Reliability is the ability to avoid and detect faults. Reliable systems report or correct errors rather than deliver corrupt or erroneous results. Computational results are reliably correct.

Availability is the ability of a system to go long periods of time without system faults that result in a crash or other downtime of a system. It may be stated in terms of hours or minutes of downtime per year. Availability may result from the ability of a system to handle a fault or a failure of a system component without downtime. For example, a failing component may be replaced with a standby component in a hot swap.

Serviceability is the ability to diagnose and repair system malfunctions. For example, a serviceable system may include an architecture that allows debugging and repair without system downtime.

As described below in reference to FIG. 1, a system may have a variety of RAS features that improve the reliability, availability, and serviceability of the system.

An extensible and flexible firmware architecture supports the RAS features of a system. For example, such an architecture allows a system to respond flexibly and effectively to certain urgent conditions (RAS conditions), such as the imminent failure of or capacity change requirement applicable to a system component. In some embodiments, if a system detects a RAS condition, it initiates an event in response to the RAS condition. In a system with RAS features, such an event may be referred to as a RAS event. As used herein, an event, including a RAS event, refers to a system's response to the imminent failure of or capacity change requirement applicable to a system component. In some embodiments, an event specifies an action to be performed as part of the event. In some further embodiments, the action is specified in one or more event attributes.

Referencing FIG. 1, in some embodiments, a system 101 has a multi-point, multi-socket system interconnect 103 that links a plurality of memories 105, a plurality of processor cores (PCore 0-PCore 3) 107, and input/output (IO) hubs 109. System interconnect 103 includes a plurality of links 108 defining routes between the memories and cores. In some embodiments, the system interconnect 103 is a Common System Interface (CSI), a product of Intel® Corporation of Santa Clara, Calif. In such embodiments, the system is said to have a CSI platform. In other embodiments, system interconnect 103 is a different type of interconnect.

CSI-based platforms have very rich RAS features, such as CPU/IO hubs, memory hot plugs, online/offline, migration, and dynamic partitioning. Most of these RAS features are supported by CSI features, such as a CSI router table, and source address decoder (SAD), target address decoder (TAD). Systems with rich RAS features benefit from having management firmware modules to manage their response to events.

Further referencing FIG. 1, system 101 includes a firmware manager 111 resident in nonvolatile memory 113 to manage events. The firmware manager 111 is communicably coupled to a plurality of firmware handlers 115, which are also resident in nonvolatile memory 113. Each firmware handler 115 is capable of performing one or more actions specified by an event. In a system with RAS features, such as a system with a CSI-based platform, the firmware manager 111 may be referred to as a RAS manager and the firmware handlers 115 may be referred to as RAS handlers.

In some embodiments, responsive to an event, control of system 101 is transferred from an operating system (not shown) to firmware manager 111. Firmware manager 111 interfaces with system resources—such as those described below with reference to FIG. 2—to obtain information regarding the event. For example, firmware manager 111 obtains information identifying an action that is specified by the event. In further embodiments, based on the action to be performed, firmware manager 111 selects a handler 115 from the plurality of firmware handlers 115. Firmware manager 111 then dispatches the selected firmware handler 115 to perform the specified action.

In further embodiments, the firmware manager 111 and the dispatched firmware handler 115 exchange system-independent, detailed information regarding the event. In one embodiment, firmware manager 111 obtains system-specific detailed information regarding the event. For example, if system 101 has a CSI-based platform, firmware manager 111 obtains detailed information regarding the event that is specific to that CSI-based platform. Firmware manager 111 then provides system-independent detailed information regarding the event to the dispatched firmware handler 115.

In one embodiment, the dispatched firmware handler 115 performs the action specified by the event using only system-independent information. Thus, this firmware architecture defines a division of labor between the firmware manager 111, which obtains and uses system-specific information and the firmware handlers 115, which do not obtain or use system-specific information. This architecture allows the firmware handlers 115 to be designed and coded independently on any specific platform. This may allow the firmware handlers 115 to be ported to a different system with a different platform—for example, from a CSI-based platform to a non-CSI-based platform.

In some embodiments, as described below with reference to FIGS. 2 and 4, the firmware manager 111 may be implemented as two separate firmware management modules—a firmware dispatcher and a firmware agent.

In some embodiments, the transfer of control to firmware manager 111 is transparent to the operating system. In further embodiments, the specified action is performed transparently with respect to the operating system. At the completion of the event, firmware manager 111 may provide notice of system changes to the operating system.

Figure 2:
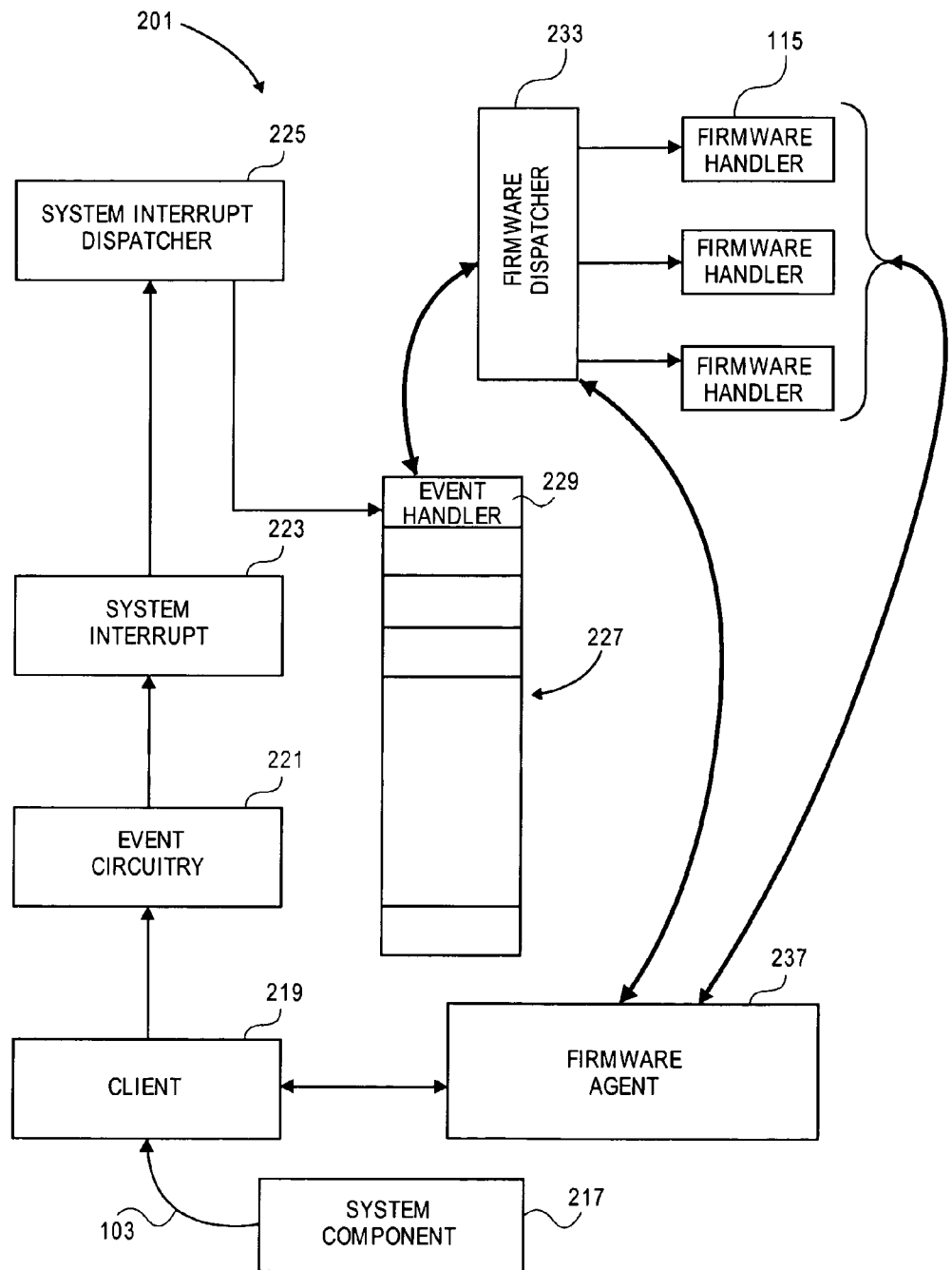
FIG. 2 is a block diagram of a system with a firmware dispatcher, firmware handlers, and a firmware agent according to certain embodiments.

Referencing FIG. 2, in some embodiments, a system 201 includes resources to initiate and handle events. In one embodiment, a client 219 is coupled via system interconnect 103 to monitor the performance of a system component 217. For example, client 219 records the frequency and types of errors made by system component 217. If the errors made by system component 217 increase sufficiently in frequency and severity, client 219 determines that failure of system component 217 is imminent. In one embodiment, client 219 then initiates an event to address the imminent failure of system component 217.

Alternatively, client 219 may receive notice of a capacity-change requirement that is applicable to system component 217 and that exceeds (or decreases) the capacity of system component 217. In one embodiment, client 219 then initiates an event to address the inability of system component 217 to meet the capacity-change requirement.

In some embodiments, client 219 is an out-of-band processor, such as a baseboard management controller (BMC). System 201 includes sensors (now shown) that report information regarding system components and their status to the BMC. These sensors communicate information regarding system components, such as processor temperature and component errors. In other embodiments, client 219 is a system service processor (SSP). Similar to the discussion above regarding a BMC, an SSP also detects and responds to information regarding systems. In other embodiments, the client 219 is an operating system. In yet other embodiments, client 219 is a remote client on a network (not shown) coupled to system 201.

Further referencing FIG. 2, client 219 initiates an event, including in some embodiments, a RAS event, by sending a signal to trigger event circuitry 221. In some embodiments, event circuitry 221 includes a system interrupt pin. The triggering of event circuitry 221 activates system interrupt 223.

In some embodiments, system interrupt 223 transfers control of the system to a system interrupt dispatcher 225. In some embodiments, system interrupt dispatcher 225 calls an event handler 229. In some embodiments, the event handler 229 is called using a pointer table 227.

In some embodiments, system interrupt 223 is transparent to the operating system. The actions performed by system interrupt dispatcher 225 and by event handler 229 are also transparent to the operating system.

In different types of systems, system interrupt 223 takes different forms. For example, in a system 201 with an IA32 (32-bit Intel® Architecture by Intel Corporation) architecture, system interrupt 223 is a System Management Interrupt (SMI). SMI causes system 201 to enter a System Management Mode in which actions may be taken transparently to the operating system. SMI transfers control of the system to an SMI dispatcher, which calls an SMI event handler.

In a system 201 with an Intel® Itanium Family Processor (IPF) architecture, system interrupt 223 is a Platform Management Interrupt (PMI). Similar to SMI, PMI allows actions to be taken transparently to the operating system. PMI passes control to a PMI dispatcher which calls a PMI event handler.

SMI and PMI are just two examples of system interrupt 223. For example, system interrupt 223 could be an interrupt generated through the Machine Check Architecture (MCA) of a Microsoft Windows 64-bit operating system. There are other possible types of system interrupts 223 as well.

Further referencing FIG. 2, in some embodiments, event handler 229 invokes firmware dispatcher 233, a firmware management module. In some embodiments, firmware dispatcher 233 communicates with another firmware management module, firmware agent 237 to obtain information regarding the event.

Firmware agent 237 acts as an agent for firmware dispatcher 233—and as discussed below for firmware handlers 115—by contacting client 219. Thus, the knowledge of how to locate and communicate with client 219 is centralized in agent 237. Under this architecture, only firmware agent 237 needs to have the system-specific information that allows it to locate and communicate with client 219. The implementation of firmware dispatcher 111 and firmware handlers 115 is thus simplified.

Upon being contacted by firmware dispatcher 111 with the information request, firmware agent 237 bridges the request to client 219 to obtain the requested information. In one embodiment, the information obtained includes an action specified by the event. Firmware dispatcher 233 thus obtains information identifying an action to be performed in connection with the event.

Firmware dispatcher 233 is coupled to a plurality of firmware handlers 115, each of which is capable of performing one or more types of independent actions specified by an event. Firmware dispatcher 233 selects one of the plurality of firmware handlers 115 based on the action to be performed. The selected firmware handler 115 is then dispatched to perform the action specified by the event.

In some embodiments, the selected firmware handler 115 exchanges system-independent detailed information regarding the event with firmware agent 237. In one embodiment, this exchange includes firmware agent 237 bridging an information request from the selected firmware handler 115 to client 219. In one embodiment, this results in firmware agent 237 obtaining system-specific, detailed information regarding the event from client 219. In one embodiment, responsive to obtaining the system-specific information regarding the event, firmware agent 237 communicates system-independent detailed information regarding the event to the selected firmware handler 115.

In some embodiments, firmware agent 237 may provide a pointer to selected firmware handler 115 for firmware handler 115 to use to invoke a call-back routine that engages firmware agent 237. For example, firmware agent 237 may provide some limited information regarding the event to selected firmware handler 115. But firmware agent 237 may also instruct the selected firmware handler 115, in the event of a specific contingency, to invoke a call-back routine to obtain further information from firmware agent 237.

In some embodiments, client 219 posts information regarding an event in a mailbox (not shown) that is accessed by firmware agent 237. Thus, to obtain the posted information, firmware agent 237 does not need to communicate with client 219. In further embodiments, firmware dispatcher 233 or firmware handlers 115 also can access the mailbox to obtain the posted information.

In some embodiments, firmware agent 237 may trigger client 219 to initiate an event for testing and debugging purposes. Thus, the system can be tested without the need for an actual RAS condition.

In some embodiments, a single composite event may specify two or more actions and require firmware dispatcher 233 to select and dispatch a plurality of firmware handlers 115. For example, a single composite event may require the replacement of system component 217. The composite event specifies a first action of removing system component 217 and a second action of adding a replacement component. Upon obtaining the above information regarding the event actions, firmware dispatcher 233 selects and dispatches a first firmware handler 115 to remove system component 217. However, in one embodiment, the first firmware handler 115 is not capable of adding a replacement component. Thus, firmware dispatcher 233 selects and dispatches a second firmware handler 115 to add a replacement component. Coordination between the first and second handlers 115 may be required—they may work in series or in parallel. In one embodiment, this coordination is performed by firmware dispatcher 233, which is able to communicate with both handlers. In another embodiment, the two handlers are capable of communicating directly with each other to coordinate their work.

In some embodiments, there are no composite events. Instead, if client 219 determines that system component 117 needs replacement, it initiates a first event to remove a component and a second event to add a component. The first event results in firmware dispatcher 233 selecting and dispatching a first firmware handler 115 to remove system component 117. Without necessarily waiting for the first event to be completed, client 219 initiates the second event, causing firmware dispatcher 233 to select and dispatch a second firmware handler 115 to add a replacement component. In different embodiments, the work of the two handlers 115 may be coordinated in series or in parallel as discussed above.

Although FIG. 2 shows firmware dispatcher 233 and firmware agent 237 as separate firmware modules, in some embodiments, they are implemented as a single firmware manager, such as firmware manager 111 of FIG. 1. The single firmware manager performs some or all of the tasks described above as being performed by firmware dispatcher 233 or firmware agent 237. In one embodiment, the single firmware manager includes a dispatcher submodule and an agent submodule, the two submodules using a shared memory to communicate regarding the event.

Figure 3A:
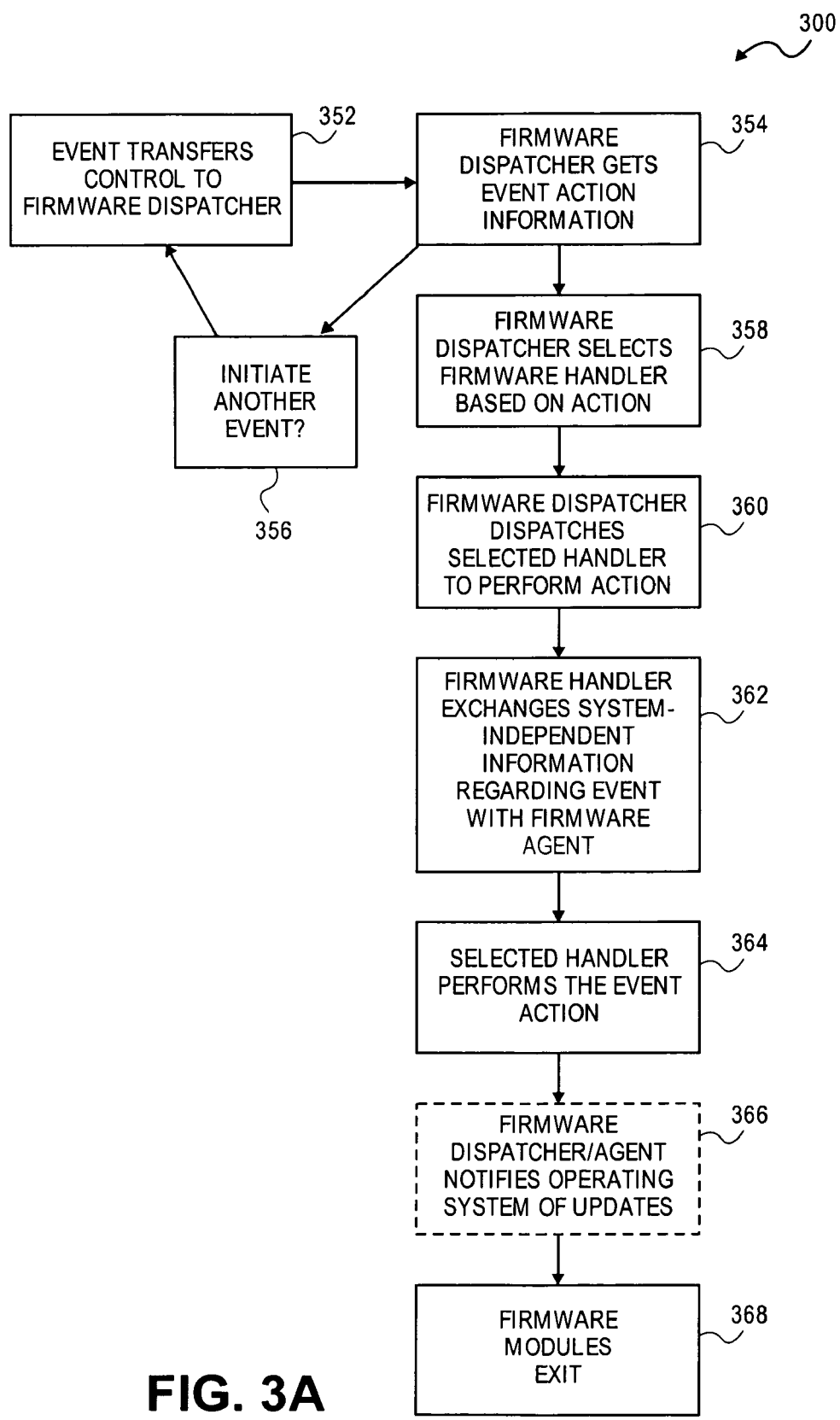
FIG. 3A is flowchart illustrating a method of processing an event according to certain embodiments.

Referencing FIG. 3A, a method of handling an event according to some embodiments includes initiating an event that transfers control of a system to a firmware dispatcher (Process Block 352). As previously discussed, an event is a response to the imminent failure of or a capacity-change requirement applicable to a system component. In some embodiments, the event results in control of the system being transferred from an operating system to the firmware dispatcher.

In some embodiments, the firmware dispatcher obtains information identifying an action to be performed as part of the event (Process Block 354). In one embodiment, firmware dispatcher requests the identifying information from a firmware agent. The firmware agent obtains the information identifying the action from a client that initiated the event. The firmware dispatcher then obtains the information identifying the specified action from the firmware agent.

Figure 3B:
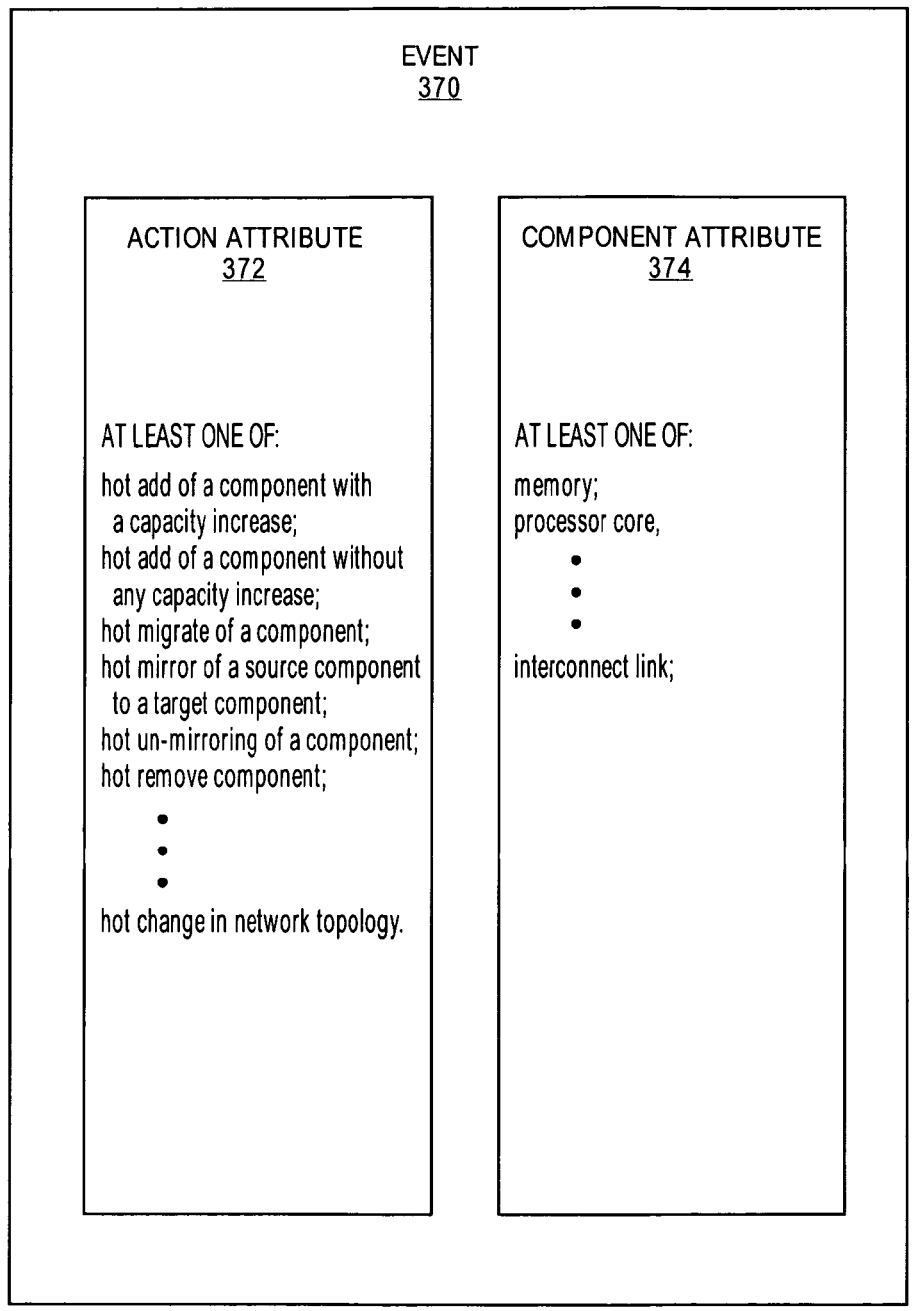
FIG. 3B is a block diagram of an event and its attributes.

Referencing FIG. 3B, in some embodiments, an event 370 includes an action attribute 372 that specifies an action to be performed as part of the event. In one embodiment, the specified action may include a hot add of a component with a capacity increase, a hot add of a component without any capacity increase, a hot migrate of a component, a hot mirror of a source component to a target component, a hot unmirroring of a component, or a hot change in network topology.

In a further embodiment, an event 370 includes a component attribute 374 that identifies a component type upon which the specified action is to be performed. In one embodiment, the identified component may be a memory, a processor core, or an interconnect link.

Further referencing FIG. 3A, in some embodiments, while the handling of an event is in progress, another event may be initiated (Process block 356). In these embodiments, the firmware dispatcher is capable of managing two different events simultaneously. In other embodiments, a second event may not be initiated while a first event is in progress.

As discussed above with reference to FIG. 2, in one embodiment, separate events are initiated when more than one action needs to be performed (e.g., to replace a component). In one embodiment, a second event may also be initiated if action is needed in response to the imminent failure of or a capacity-change requirement applicable to a second component.

Further referencing FIG. 3A, in some embodiments, the firmware dispatcher selects a firmware handler from a plurality of handlers based on the action to be performed (Process Block 358). In one embodiment, the firmware dispatcher is aware of specific actions that each firmware handler is capable of performing. In one embodiment, each firmware handler registers with the firmware dispatcher during boot of the system. During the registration, the firmware handlers identify one or more specific actions they are capable of performing. In a further embodiment, the firmware handlers identify other operational parameters during registration, such as specific types of events for which they should be selected. The firmware dispatcher then dispatches the selected firmware handler to perform the specified action (Process Block 360).

In some embodiments, the dispatched firmware handler exchanges system-independent information regarding the event with a firmware agent (Process Block 362). In one embodiment, if the specified action includes action regarding a designated system component, then the exchanged information includes identification and location information regarding the designated system component.

In some embodiments, the exchange of information is through an interface. In one embodiment, the firmware handler queries the firmware agent for information regarding the event using a system-independent interface presented by the manager. In a further embodiment, the firmware agent bridges the information request to a system-monitoring resource (such as client 219 of FIG. 2) and obtains system-specific information regarding the event. The firmware agent, through the interface, then provides the firmware handler system-independent information regarding the event.

Further referencing FIG. 3A, the dispatched firmware handler performs the specified event action (Process Block 364). In some embodiments, the firmware handler performs the specified action using only system-independent information. However, some actions require system-specific action. For example, an action that changes the system topology may require the computation of a shortest route over an interconnect between two components. Computation of the shortest route between two components likely requires system-specific information.

In one embodiment, the firmware dispatcher possesses the logic to perform system-specific actions, such as computing the shortest route over between two components. In a further embodiment, the firmware dispatcher provides the firmware handler with system-independent interfaces with which to call functions to perform actions requiring system-specific information—such as a shortest route computation. In some implementations, the functions exposed by the interfaces are implemented by the firmware dispatcher using system-specific information.

In one embodiment, the firmware agent possesses the logic to perform the system-specific actions described above. It is the firmware agent that provides the system-independent interface to the firmware handler, as discussed above.

Further referencing FIG. 3A, in some embodiments, once the specified action is completed, either the firmware dispatcher or the firmware agent may notify the operating system of updates (Process Block 366). In one embodiment, the firmware agent notifies the operating system of an update using interfaces with clients (for example, client 219 of FIG. 2) or other system resources. In one embodiment, the firmware dispatcher notifies the operating system of an update using a service or management interface. For example, the firmware dispatcher may communicate with an operating system using a System Control Interrupt of the Advanced Configuration and Power Management Interface (See, ACPI Specification 3.0b (2006)), which is well-known. Once the event is completed, the firmware dispatcher and the other firmware modules exit (Process Block 368).

Although the methods described with reference to FIG. 3A utilize both a firmware dispatcher and a firmware agent, in some embodiments a single firmware manager may be utilized to perform the tasks of each (See, for example, firmware manager 111 of FIG. 1).

Figure 4:
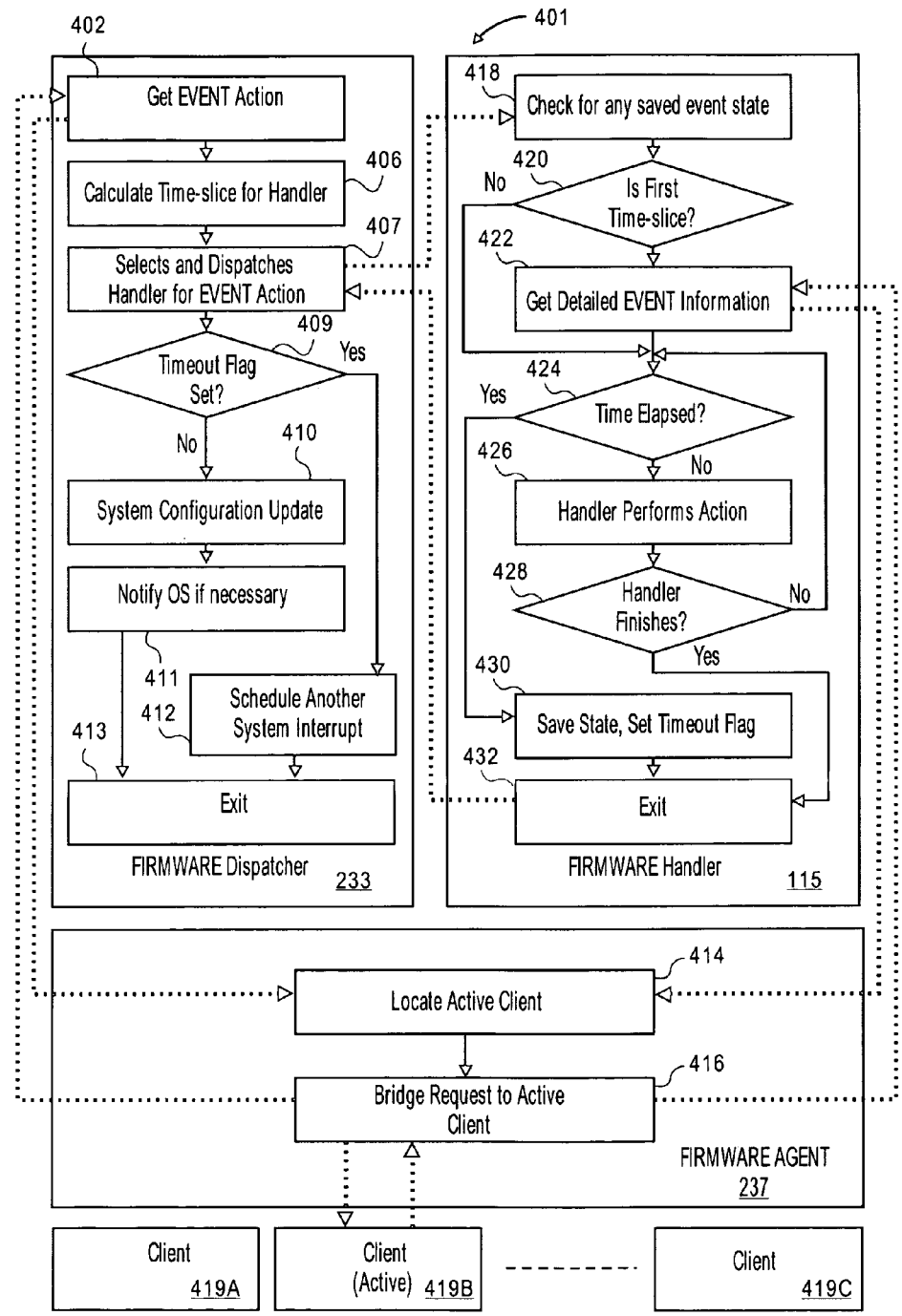
FIG. 4 is a block diagram illustrating interaction among a firmware dispatcher, firmware agent, and firmware handlers according to certain embodiments.

Referencing FIG. 4, in some embodiments, a system 401 includes a firmware dispatcher 233, a firmware handler 115, a firmware agent 237, and clients 419A, 419B . . . 419C. In some embodiments, system 401 supports the management of time-slices for firmware handlers performing actions associated with an event.

Responsive to an event, control of system 401 is transferred to firmware dispatcher 233, which requests information identifying an action specified by the event from firmware agent 237 (Process Block 402).

In some embodiments, upon receiving the request, firmware agent 237 locates the active client 419B that initiated the event from a group of clients 419A, 419B . . . 419C (Process Block 414). Firmware agent 237 bridges the information request to the active client 419B, obtains the information regarding the action specified by the event, and communicates the requested information to firmware dispatcher 233 (Process Block 416). In other embodiments, as previously discussed, firmware agent 237 obtains the information from a mailbox in which active client 419B deposited the information. Bridging a request to the client may therefore be unnecessary.

In some embodiments, the firmware dispatcher 233 manages time-slices within which the firmware handler 115 performs the action. In further embodiments, the firmware dispatcher 233 calculates the length of the time-slice (Process Block 406). In one embodiment, an operating system is preempted for the duration of the time-slice. And the firmware dispatcher 233 determines the length of the time-slice based on system-specific information regarding the stability of the operating system as the length of time it is preempted by the time-slice increases.

In some embodiments, the firmware dispatcher 233 selects firmware handler 115 based on the action specified by the event and then dispatches the firmware handler 115 to perform the action (Process Block 407). In some embodiments, the dispatched firmware handler 115 checks for any state saved for the current event (418). As discussed below, at the end of the current time-slice, firmware handler 115 saves state regarding the current event. Therefore, upon beginning a time-slice, firmware handler 115 checks for any saved state.

In some embodiments, based on the presence or absence of saved state regarding the current event, the firmware handler 115 determines whether the current time-slice is the first time-slice for the current event (Process Block 420). If there is no saved state, then the firmware handler 115 determines that the current time-slice is the first time-slice for the current event. In one embodiment, the firmware handler 115 then requests detailed information regarding the event from firmware agent 237 (Process Block 422). As discussed above with respect to FIG. 3A, this detailed information may include identification and location information regarding a system component.

In response to the request, in some embodiments, firmware agent 237 locates the active client that initiated the event—as discussed above (Process Block 414). In one embodiment, clients register with firmware agent at system boot time. This allows firmware agent to identify all the clients and to locate the active client.

In one embodiment, firmware agent 237 bridges the request for detailed information to the active client 419B, receives the detailed information, and provides the detailed information to the firmware handler 115 (Process Block 416). In other embodiments, as discussed above, active client 419B has posted detailed information regarding the event to a mailbox, and firmware agent 237 obtains the detailed information from the mailbox.

In some embodiments, if firmware handler 115 finds saved state regarding the event, then it determines that the current time-slice is not the first time-slice. Firmware handler 115 may not need to request further detailed information from firmware agent 237. Instead, firmware handler 115 checks whether the time for the current time-slice has elapsed (Process Block 424). If the time for the current time-slice has not elapsed, firmware handler 115 begins performing the specified action (Process Block 426). The firmware handler 115 periodically rechecks whether the time for the current time-slice has elapsed (Process Block 424). If firmware handler 115 finishes the action before the time for the current time-slice elapses (Process Block 428), then it exits (Process Block 432) and control returns to the firmware dispatcher 233 (Process Block 407).

In some embodiments, if the firmware handler 115 does not complete the specified action before the current time-slice ends, then it saves state regarding the event and sets a timeout flag (Process Block 430). In one embodiment, the firmware handler 115 saves the state by providing the state to firmware dispatcher 233 and firmware dispatcher 233 saves the state.

Having saved the event state and set the timeout flag, firmware handler 115 exits (Process Block 432) and control again returns to firmware dispatcher 233 (Process Block 407). In other embodiments, rather than the firmware handler 115 exiting, the firmware dispatcher 233 terminates the firmware handler 115.

In some embodiments, upon recovering control from firmware handler 115, firmware dispatcher 233 checks whether the timeout flag is set (Process Block 409). If the timeout flag is set, then another time-slice to finish the action is needed and firmware dispatcher 233 schedules another system interrupt (Process Block 412) and exits (Process Block 413). As discussed above with respect to FIG. 2, system 401 may use different types of system interrupts to handle events, dependent upon a variety of factors, including the processor architecture. In an example where the system interrupt is an SMI interrupt, then another SMI interrupt is scheduled.

If the timeout flag is not set, then the firmware dispatcher 233 knows that the action has been completed. It performs any system configuration updates (Process Block 410). If a notification to the operating system is necessary, the firmware dispatcher 233 performs the operating system notifications (Process Block 411) and exits (Process Block 413).

Any reference in this specification to "one embodiment," "some embodiments," "example embodiment," etc., means that a particular feature, structure, or characteristic described in connection with the embodiment is included in at least one embodiment of the invention. The appearances of such phrases in various places in the specification are not necessarily all referring to the same embodiment or embodiments. Further, when a particular feature, structure, or characteristic is described in connection with any embodiment, it is submitted that it is within the purview of one skilled in the art to affect such feature, structure, or characteristic in connection with other ones of the embodiments. Furthermore, for ease of understanding, certain method procedures may have been delineated as separate procedures; however, these separately delineated procedures should not be construed as necessarily order dependent in their performance. That is, some procedures may be able to be performed in an alternative ordering or simultaneously, as one or ordinary skill would appreciate based at least on the teachings provided herein.

Embodiments of the present invention may be described in sufficient detail to enable those skilled in the art to practice the invention. Other embodiments may be utilized, and structural, logical, and intellectual changes may be made without departing from the scope of the present invention. Moreover, it is to be understood that various embodiments of the invention, although different, are not necessarily mutually exclusive. For example, a particular feature, structure, or characteristic described in one embodiment may be included within other embodiments. Accordingly, the detailed description is not to be taken in a limiting sense.

The foregoing embodiments and advantages are merely exemplary and are not to be construed as limiting the present invention. Those skilled in the art can appreciate from the foregoing description that the techniques of the embodiments of the invention can be implemented in a variety of forms. Therefore, while the embodiments of this invention have been described in connection with particular examples thereof, the true scope of the embodiments of the invention should not be so limited since other modifications will become apparent to the skilled practitioner upon a study of the drawing, specification, and following claims.

We claim:

1. A method comprising:
    transferring control of a system from an operating system to a firmware manager responsive to an event, wherein the event is a response to an imminent failure of or capacity change requirement applicable to a component of the system, the event specifying an action to be performed;
    determining, by the firmware manager, a length of time of a time slice for performing the action by a firmware handler;
    selecting, by the firmware manager, the firmware handler from a plurality of firmware handlers in response to determining the length of time of the time slice, the selecting based on the action to be performed as specified by the event and the capability of the firmware handler to perform the action;

dispatching, by the firmware manager, the selected firmware handler to perform the action specified by the event;
requesting, by the selected firmware handler, system-independent information about the action specified by the event;
exchanging, in response to requesting the system-independent information regarding the event, the system-independent information between the firmware manager and the dispatched selected firmware handler to perform the action;
performing during the length of time of the time slice, by the firmware handler, the action specified by the event, wherein the action is performed in response to the exchanged system-independent information; and
performing the following if the selected firmware handler does not finish performing the action within the time slice:
saving a state regarding the event;
scheduling a second time slice associated with the event; and
terminating the selected firmware handler.

2. The method of claim 1, wherein the action is selected from the group consisting of a hot add of a component with a capacity increase, a hot add of a component without any capacity increase, a hot migrate of a component, a hot mirror of a source component to a target component, a hot un-mirroring of a component, and a hot change in a network topology.

3. The method of claim 2, wherein the event specifies an action attribute that indicates the action to be performed, and wherein the action is performed on a system component that includes a memory, a processor core, and a link in a system route.

4. The method of claim 1, wherein the event is a reliability, availability and serviceability (RAS) event.

5. The method of claim 4, wherein an interrupt is generated in response to the RAS event and the transferring of control is responsive to the interrupt.

6. The method of claim 1, wherein the specified action is to be performed transparently with respect to the operating system.

7. The method of claim 1, wherein the firmware manager is implemented as two separate firmware modules, including:
a dispatcher that performs the selecting and the dispatching; and
an agent that performs the exchanging of the system-independent information with the selected firmware handler.

8. The method of claim 1, further comprising:
preempting the operating system for a length of time of the time slice; and
determining, by the firmware manager, the length of the time slice based on platform-specific information regarding the stability of the operating system as the length of time it is preempted by the time slice increases.

9. The method of claim 1, further comprising checking for and finding the saved state regarding the event at the commencement of the second time slice.

10. The method of claim 1, wherein exchanging of the system-independent information between the firmware manager and the selected firmware handler includes:
requesting, by the firmware handler, the firmware manager for information regarding the event via a system-independent interface presented by the firmware manager;
bridging, by the firmware manager, the information request to a system monitoring resource and obtaining system-specific information regarding the event; and
providing, by the manager, to the firmware handler, through the system-independent interface, the system-independent information regarding the event.

11. The method of claim 10, wherein exchanging the system-independent information further includes: instructing the handler, by the firmware manager, to invoke a call-back routine upon the occurrence of a specific contingency.

12. The method of claim 1, wherein the action includes action regarding a designated system component, and wherein the system-independent information exchanged between the firmware manager and the selected firmware handler includes identification and location information regarding the system component.

13. The method of claim 1, further comprising providing, by the firmware manager, the handler with system-independent interfaces with which to call functions to perform a portion of the action, wherein the functions are implemented by the firmware manager via system-specific information.

14. The method of claim 1, further comprising:
notifying, by the firmware manager, the operating system of a system change in response to completing the action.

15. A system comprising:
a plurality of processor cores;
a plurality of memories;
a plurality of links defining routes between some of the cores and memories;
a firmware dispatcher module stored in a memory of the plurality of memories to instruct a processor core of the plurality of processor cores:
to transfer control of the system from an operating system to the firmware dispatcher responsive to an event, wherein the event is a response to an imminent failure of or capacity change requirement applicable to a system component and the event specifies an action to be performed;
to determine a length of time of a time slice for performing the action by a firmware handler;
to select a firmware handler from a plurality of firmware handlers in response to determining the length of time of the time slice, the selecting based on the action to be performed and the capability of the firmware handler to perform the action; and
to dispatch the selected firmware handler to perform the action specified by the event;
a firmware agent module stored in the memory to instruct the processor core to obtain system-specific information regarding the event and to provide system-independent information regarding the event to the dispatched firmware handler; and
wherein the dispatched selected firmware handler to perform the action during the length of time of the time slice, the action performed in response to the system-independent information provided to the dispatched selected firmware handler, and
wherein the firmware dispatcher module to perform the following if the selected firmware handler does not finish performing the action within the time slice:
saving a state regarding the event;
scheduling a second time slice associated with the event; and
terminating the selected firmware handler.

16. The system of claim 15, wherein the specified action is selected from the group consisting of a hot add of a memory without an increase in memory capacity, a hot add of a memory with an increase in memory capacity, a hot remove of a memory, a hot migrate of a memory, a hot add of a core, a hot remove of a core, a hot migrate of a core, a hot mirror of a memory, a hot un-mirror of a memory, and a hot change of a network topology.

17. The system of claim 15, wherein the firmware dispatcher module to further instruct the processor core:
to preempt the operating system for the length of time of the time slice; and
to determine the length of the time slice based on platform-specific information regarding the stability of the operating system as the length of time it is preempted by the time slice increases.

18. The system of claim 15, further comprising:
a client to detect an imminent failure of or capacity change requirement applicable to the system component and to initiate the event.

19. The system of claim 18, wherein the client is one of the following:
an out-of-band processor,
an operating system,
a baseboard management controller,
a service system controller, and
an operating system.

20. The system of claim 18, further comprising:
the firmware agent module to instruct the processor core to obtain system-specific information regarding the event through an interface with the client.

21. The system of claim 20, wherein the firmware agent model to:
instruct the processor core to obtain information identifying the action specified by the event through the interface with the client; and
instruct, before selecting the firmware handler, the processor core to obtain information identifying the action specified by the event by requesting the identifying information from the firmware agent.

22. The system of claim 18, wherein:
the client to detect an imminent failure of or capacity change requirement applicable to a second system component and to initiate a second event.

23. A machine readable physical storage medium comprising a plurality of instructions that, in response to being executed, result in an apparatus to perform a method, the method comprising:
transferring control of a system from an operating system to a firmware manager responsive to an event, wherein the event is a response to an imminent failure of or capacity change requirement applicable to a component of the system, the event specifying an action to be performed;
determining, by the firmware manager, a length of time of a time slice for performing the action by a firmware handler;
selecting, by the firmware manager, the firmware handler from a plurality of firmware handlers in response to determining the length of time of the time slice, the selecting based on the action to be performed as specified by the event and the capability of the firmware handler to perform the action;
dispatching, by the firmware manager, the selected firmware handler to perform the action specified by the event;
requesting, by the selected firmware handler, system-independent information about the action specified by the event;
exchanging, in response to requesting, the system-independent information regarding the event between the firmware manager and the dispatched selected firmware handler to perform the action;
performing during the length of time of the time slice, by the firmware handler, the action specified by the event, wherein the action is performed in response to the exchanged system-independent information; and
performing the following if the selected firmware handler does not finish performing the action within the time slice:
saving a state regarding the event;
scheduling a second time slice associated with the event; and
terminating the selected firmware handler.

24. The machine readable medium of claim 23, wherein the action is selected from the group consisting of a hot add of a component with a capacity increase, a hot add of a component without any capacity increase, a hot migrate of a component, a hot mirror of a source component to a target component, a hot un-mirroring of a component, and a hot change in a network topology.

25. The machine readable medium of claim 24, wherein the event specifies an action attribute that indicates the action to be performed, and wherein the action is performed on a system component that includes a memory, a processor core, and a link in a system route.

26. The machine readable medium of claim 23, further comprising:
preempting the operating system for a length of time of the time slice; and
determining, by the firmware manager, the length of the time slice based on platform-specific information regarding the stability of the operating system as the length of time it is preempted by the time slice increases.

27. The machine readable medium of claim 23, further comprising, prior to the event, registering a firmware handler with the firmware manager as being capable of performing a specific action.

* * * * *